United States Patent [19]

Vienne

[11] Patent Number: 4,457,889
[45] Date of Patent: Jul. 3, 1984

[54] PROCESS AND DEVICE FOR EMERGENCY COOLING OF A NUCLEAR REACTOR

[75] Inventor: Alain Vienne, Andresy, France

[73] Assignee: Framatome, Courbevoie, France

[21] Appl. No.: 279,406

[22] Filed: Jul. 1, 1981

[30] Foreign Application Priority Data

Jul. 25, 1980 [FR] France ............................ 80 16432

[51] Int. Cl.³ ............................................. G21C 15/18
[52] U.S. Cl. ....................................... 376/282; 376/283; 376/298
[58] Field of Search .................. 376/282, 298, 299, 283

[56] References Cited

U.S. PATENT DOCUMENTS

| 3,321,374 | 5/1967 | Windle et al. | 376/283 |
| 3,431,168 | 3/1969 | Kjemtrup. | |
| 4,104,119 | 8/1978 | Schilling | 376/282 |
| 4,187,146 | 2/1980 | Shen et al. | 376/298 |
| 4,236,968 | 12/1980 | Werker et al. | 376/299 |
| 4,239,596 | 12/1980 | Bevilacqua et al. | 376/282 |
| 4,278,500 | 7/1981 | Ailloud et al. | 376/282 |
| 4,360,496 | 11/1982 | Marker et al. | 376/298 |

FOREIGN PATENT DOCUMENTS

| 2459150 | 6/1976 | Fed. Rep. of Germany | 376/299 |
| 2554180 | 6/1977 | Fed. Rep. of Germany | 376/298 |
| 53-92100 | 8/1978 | Japan | 376/282 |

OTHER PUBLICATIONS

J. British Nucl. Energy Soc., Apr. 1975, vol. 14, No. 2, p. 111.

Primary Examiner—Harvey E. Behrend
Attorney, Agent, or Firm—Pollock, Vande Sande & Priddy

[57] ABSTRACT

Process and device for emergency cooling of a nuclear reactor comprising a steam generator (2) heated by a primary circuit and cooled by a secondary circuit producing steam, and in which in case of an emergency shutdown of the reactor, the emergency feed (50) of the secondary circuit is provided from an emergency reservoir (5), by an auxiliary pump (51) driven by steam derived at the output from the generator. At least part of the steam continuing to be produced during the cooling process is condensed in an air condenser (6) and the condensed water is recycled to the emergency reservoir (5). The power for the air condenser is supplied from another withdrawn portion (70) of steam.

2 Claims, 1 Drawing Figure

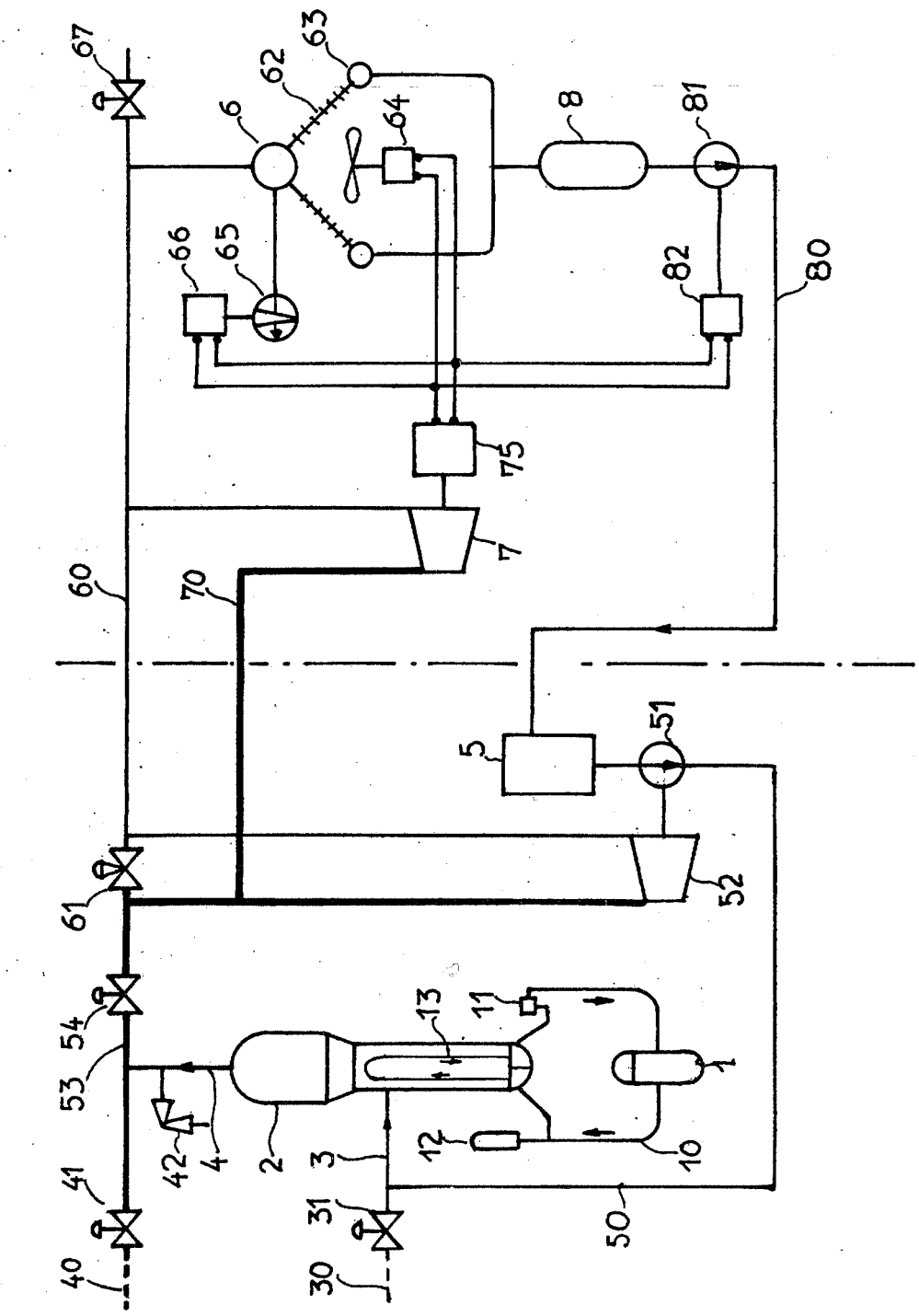

PROCESS AND DEVICE FOR EMERGENCY COOLING OF A NUCLEAR REACTOR

The invention relates to a process and device for carrying out emergency cooling of a nuclear reactor, and applies in particular to pressurized water nuclear plants.

In a nuclear reactor, especially a pressurized water reactor, a closed primary cooling circuit for the core exchanges thermal energy, directly or by means of another circuit with a secondary fluid, generally water, circulating in steam generators. During an emergency stoppage, following a breakdown independent of the boiler, the extraction of energy from the core of the reactor must be maintained. This is carried out by feeding the steam generators with secondary fluid from an emergency water reservoir and by means of emergency feed pumps. But the breakdown justifying the emergency stoppage may be combined with a complete lack of internal and external sources of electrical energy. This is why the pump in the backup feed circuit is usually able to be driven by a turbine activated by steam drawn off through a by-pass pipe connected to the main evacuation circuit of the steam generator.

In general, provision is made to release the steam issuing from the steam generator into the atmosphere, through the steam bypass or into the main condenser; but in the circumstances contemplated by the invention, the latter is unavailable owing to the absence of electrical energy.

Various systems have already been proposed to improve the emergency cooling system.

Thus, provision has been made to use an autonomous circuit for extracting energy from the generator in case of an emergency shutdown, in which part of the steam produced is directed towards a converter which produces a low pressure steam from a circuit of feed water using the storage capacity of the emergency water reserve. The low pressure steam is fed into a turbo-alternator, the turbine of which supplies the electrical energy for the pumps in the system.

Such a system does not use the whole of the steam produced by the generator, and thus the remainder of the steam must to be released into the atmosphere.

Thus a large part of the emergency water reserve which feeds the steam generator is lost and, as the emergency cooling may last for several hours, the reserve must be of a large capacity. In order to remedy this disadvantage, provision is made to use the water capacity of an underground supply, but this is of course only possible if a supply is available, and moreover this water is not treated and it is not desirable to feed the secondary circuit over a period of several hours with untreated water.

Provision has also been made to use, for the extraction of energy from the reactor, a closed circuit comprising an emergency feed water tank fitted with a bubbling condensation device, and an emergency feed pump. The steam produced by the steam generators is directed towards the emergency tank where it is condensed by bubbling. This tank must therefore have very large dimensions, and even then the tank must be provided with a vent allowing the steam to be rejected into the atmosphere as long as it is at a high pressure.

Present invention relates to an emergency cooling system which does not have the disadvantages of known systems and, in particular, provides for autonomous operation and under closed circuit conditions, at least during the major part of the cooling process.

According to the invention, at least part of the steam is condensed in an air condenser the operational energy of which is supplied by another part of the steam supply, and the condensed water is recycled to the emergency reservoir.

According to a preferred method of operation, part of the steam produced is diverted towards an auxiliary turbine right at the start of the emergency cooling procedure in order to control the start up of the air condenser, the remainder of the steam being first evacuated into the atmosphere, and then partly diverted towards the air condenser after the starting up of the latter, the flow evacuated into the atmosphere then diminishing to nothing when the condensation capacity of the air condenser corresponds to the production of the steam, the system then functioning in a closed circuit until the reactor is completely cooled.

The device for operating the procedure according to the invention comprises a circuit for feeding the air condenser with steam connected to the circuit for evacuating the steam, a circuit for recycling the condensed water towards the emergency tank and at least one auxiliary turbine driven by a part of the evacuated steam and supplying the energy necessary for the operation of the air condenser and for the recycling of the condensed water.

In a particular embodiment in which the air condenser comprises a blower and a vacuum pump and the recycling circuit comprising a motor-driven pump, these parts are driven by electric motors fed with current supplied by an alternator itself driven by the auxiliary turbine.

In another embodiment, the various parts of the air condenser and of the recycling circuit are driven by rotary turbines directly fed with steam drawn off from the main evacuation circuit.

The invention will now be described by referring to a particular embodiment, given by way of example.

The drawing represents schematically an emergency cooling system according to the invention.

On the left side of the diagram is shown the nuclear reactor 1 cooled by a primary circuit 10 with a primary pump 11 and a pressurizer 12, and passing through a group of tubes 13 inside a steam generator 2; the secondary circuit of the steam generator comprises a feed pipe for water 3 and a pipe 4 for evacuating the steam produced in the generator.

The pipe 3 is connected to a circuit 30 for the normal supply of feed water and the pipe 4 for evacuating the steam is connected to a circuit 40 for normal supply of steam to the turbines if one is dealing with an electric power station.

The feed circuit 30 and the evacuation circuit 40 may be of any conventional type.

In case of an emergency shutdown, valves 31 and 41 allow the normal circuits of feed water and the circuits for the evacuation of the steam to be isolated. In this case, the steam may be released into the atmosphere by a discharge valve 42 positioned in the evacuation circuit 4 upstream of the isolation valve 41.

Of course, in an emergency shutdown, the nuclear reaction is immediately arrested by the descent of control rods, but the combustible elements of the reactor must still be cooled for several hours by the primary circuit, which is itself cooled in the steam generator. The latter must therefore continue to operate and this is why it can be fed, from a tank 5 of treated feed water, by a feed circuit 50 which issues into the feed pipe 3 downstream of the isolating valve 31 of the normal circuit 30. In a manner known per se, the circulation of the emergency feed water is assured by a turbo pump 51 driven by an auxiliary turbine 52 capable of being fed with steam by a circuit 53 connected in by-pass to the principal evacuation circuit 4, upstream of the isolation valve 41 and itself provided with a shutoff valve 54.

When the reactor is shut down in an emergency owing to the unavailability of electrical energy, the isolation members 31 and 41 are automatically closed in order to separate the normal circuits for feed with water 30 and evacuation of the steam 40. Simultaneously, the shutoff valve 54 opens and the auxiliary turbine 52 is put into operation and drives the pump 51 which assures the transfer of the water contained in the tank 5 to the steam generator 2. Under the normal system, the steam produced is released into the atmosphere by the discharge valve 42.

The system according to the invention comprises two other circuits 60 and 70 for use of the steam, connected in by-pass to the circuit 53 downstream of the shutoff valve 54 and terminating at new devices represented on the right side of the diagram.

The circuit 60, fed by means of a pressure release valve 61, issues into an air condenser 6 composed of a group of finned tubes 62 connected to a collector 63 and cooled by circulation of the air produced by a blower 64. In order to improve the operation, the air condenser 6 may be put under vacuum produced by a vacuum pump 65 driven by a motor 66.

Moreover, the water condensed in the tubes 62 and collected in the collector 63 is directed towards a tank 8 connected to the emergency reservoir 5 by a recycling circuit 80 provided with a pump 81 driven by a motor 82.

One of the originalities of the system consists in using, in addition to the conventional turbo pump 51, 52 of the circuit for feeding with water, an additional auxiliary turbine 7 fed with steam by the circuit 70 connected to the circuit 53 for evacuation of the steam, for example downstream of the shutoff valve 54. The auxiliary turbine 7 drives an alternator 75 which supplies the necessary current for the operation of the various parts of the system, and in particular for the motor 82 of the extraction pump of the circuit for recycling of the water, for the motor of the blower 64 of the air condenser, and for the motor 66 of the system 65 for creating a vacuum in the air condenser 6.

At the moment when the emergency cooling process begins, after isolation of the circuits 30 and 40 by closing the valves 31 and 41, the turbine 7 is fed at the same time as emergency feed turbo pump 51-52 and progressively assures the putting into operation of the air condenser 6, especially by creating a vacuum in it. During this time, the steam which is not used to drive the turbines 7 and 52 is released into the atmosphere, in the conventional way, by the valve 42.

When the air condenser is in operation, its capacity is usually not sufficient to absorb the whole of the steam produced at the beginning of the emergency shutdown. This is why the circuit 60 for feeding the air condenser comprises a valve for discharge into the atmosphere 67, the rest of the steam being, if necessary, discharged into the atmosphere by the valve 42. However, the reactor cools down progressively and, upon expiration of a period which depends on the residual energy of the reactor, but which may last for several hours, the system is stabilized and thus operates entirely in a closed loop. The discharge members 42 and 67 thus remain closed, the energy issuing from the steam generator through the circuit 53 being equal to the energy discharged into the air by the air condenser 6. In this case, part of the steam is always used mechanically in the turbines 7 and 52, but the whole of the remaining steam is condensed in the air condenser 6 after release through the valve 61 downstream of which issue the pipes for evacuation of the steam expanded in the turbines 7 and 52, which is also condensed in the air condenser 6.

The whole of the condensate is recycled by the motor pump 81 towards the emergency reservoir 5. Steam is consequently only discharged into the atmosphere at the beginning of the cooling process, to the extent to which it is not desirable to make the air condenser too big. However, since this discharge into the atmosphere is only produced during a fraction of the total cooling time, the emergency water reservoir 5, which, during all the rest of the cooling process is fed by the recycling circuit 80, may not be of excessive dimensions.

Moreover, an essential advantage of the invention lies in the fact that the steam generator is always fed with treated water. Once the system is stabilized, the reactor may without disadvantage be cooled in an intermediate shutdown stage during a very lengthy period while awaiting the start of refrigeration while shut down or the repair of the fault which caused the emergency shutdown.

The invention is not limited to the details of the embodiment which has just been described and which may form the subject of variations, especially by using equivalent means.

Thus, if it seems judicious to control all of the various parts of the system by electrical motors fed by a turbo alternator, one might also envisage the driving of these various parts directly or indirectly by means of one or several turbo machines connected in by-pass to the circuit for evacuation of the steam.

Moreover, as the system is totally independent of the electrical energy from emergency diesel generators, it may of course be added to the conventional systems used to date and employing alternative emergency means which may moreover assure the supply for simultaneous safety operations.

While in the description of the invention, reference has been made to a pressurized water reactor, the invention is applicable each time there is at least one buffer circuit between the core and the secondary steam generating circuit. In particular, in the case of fast neutron reactors cooled by liquid metal, in which the primary cooling fluid of the core transfers the energy to a buffer circuit of gas or liquid metal which comprises a steam generator, the emergency circuit according to the invention may be applied to this production of steam.

I claim:

1. A nuclear reactor system emergency cooling process comprising at least one primary coolant circuit (10) for the heating of secondary coolant water in a steam generator (2), and a secondary circuit (3) for feeding with said secondary coolant water and for evacuation (4) of the steam produced in said generator through indirect contact of the secondary coolant water with the coolant of said primary circuit, an emergency feed water circuit for said secondary circuit, said emergency feed water circuit comprising a water reservoir (5) connected to a water feed pipe by a circuit (50) for emergency feeding comprising a first auxiliary pump (51) driven by a first auxiliary turbine (52) actuated by steam drawn off by means of a pipe (53) connected in by-pass to said circuit (4) for evacuation of the steam of said generator, an air condenser associated with a blower and with a vacuum system for maintaining a vacuum in said air condenser, a first conduit connected between said steam evacuation circuit and said air condenser for supplying steam to said air condenser, a second conduit connecting said air condenser to said water reservoir for recycling water condensed in said air condenser to said water reservoir, said second conduit having a second auxiliary pump for effecting the recycling of said condensed water to said reservoir, means for actuating said second auxiliary pump and said blower and said vacuum system, a third conduit for supplying steam from said steam evacuation circuit to a second auxiliary turbine for actuating said actuation means, comprising the steps of (a) condensing at least one portion of the steam produced in said generator in said air condenser using another portion of said steam for actuating said blower and said vacuum system using said second auxiliary turbine;

(b) recycling the water resulting from condensation of said at least one portion to said reservoir, utilizing a third portion of said steam for actuating said first auxiliary turbine and recycling the water from said reservoir to said water feed pipe using said first auxiliary pump;

(c) directing some of said another portion of said steam toward said second auxiliary turbine immediately upon the start of said emergency cooling process, whereby to control the start-up of said air condenser, evacuating the remainder of said another portion of to atmosphere and then progressively diverting said remainder of said another portion of steam to said air condenser after operation thereof has commenced, the portion discharged to atmosphere diminishing to nothing when the condensation capacity of said air condenser corresponds to the production of steam, whereby cooling proceeds in a closed circuit until said generator is completely cooled.

2. A nuclear reactor system emergency cooling device, comprising (a) a primary circuit for the heating of a steam generator;

(b) a secondary circuit for feeding said generator with water for evacuation of steam produced therein;

(c) a water reservoir;

(d) an emergency feed water circuit connecting to said water reservoir to said secondary circuit for feeding said generator with water, said emergency feed water circuit including a first auxiliary pump driven by a first turbine said, first turbine being in fluid communication with and driven by steam branched off from said steam evacuation circuit;

(e) an air condenser associated with a blower and with a vacuum system for maintaining a vacuum in said air condenser;

(f) a circuit for supplying steam to said air condenser branched off from said steam evacuation circuit;

(g) a circuit for recycling the water condensed in said air condenser to said water reservoir, said recycling circuit comprising a second auxiliary pump and means for driving all three of said blower and said second auxiliary pump and said system for placing said air condenser under vacuum, said means being actuated by a second turbine, said second turbine being in fluid communication with and driven by steam branched off from said steam evacuation circuit.

* * * * *